United States Patent [19]

Oushige et al.

[11] 3,902,662

[45] Sept. 2, 1975

[54] MICROFICHE STORING MEANS

[75] Inventors: Takayoshi Oushige; Toshio Murai, both of Hitachi, Japan

[73] Assignee: Hitachi, Ltd., Japan

[22] Filed: Mar. 16, 1973

[21] Appl. No.: 341,845

[30] Foreign Application Priority Data

Mar. 17, 1972 Japan .............................. 47-26652

[52] U.S. Cl........ 235/61.12 M; 209/80.5; 209/110.5

[51] Int. Cl.[2] .................. G06K 19/02; G06K 19/06

[58] Field of Search.................235/61.12 R, 61.12 N, 235/61.12 M; 209/80.5, 110.5, 111.8; 40/158 B, 159; 353/25, 26, 27

[56] References Cited

UNITED STATES PATENTS

| | | | |
|---|---|---|---|
| 1,846,779 | 2/1932 | Whitson | 209/111.8 |
| 2,577,460 | 12/1951 | Gottschalk | 209/111.8 |
| 2,794,282 | 6/1957 | Sherman et al. | 209/111.8 |
| 2,954,032 | 9/1960 | Dahl | 209/111.8 |
| 3,033,208 | 5/1962 | Mathiesen | 209/111.8 |
| 3,073,313 | 1/1963 | Mittag | 209/111.5 |
| 3,238,655 | 3/1966 | Engelstein | 40/159 |
| 3,266,497 | 8/1966 | Bleiman | 209/80.5 |
| 3,520,405 | 7/1970 | Young | 209/111.8 |
| 3,552,562 | 1/1971 | Silverberg | 209/80.5 |
| 3,555,248 | 1/1971 | Irasek et al. | 235/61.12 R |
| 3,647,064 | 3/1972 | Rosenburg | 209/80.5 |
| 3,670,885 | 6/1972 | Harlow | 209/111.8 |
| 3,729,094 | 4/1973 | Engelstein et al. | 209/80.5 |

*Primary Examiner*—Thomas J. Sloyan
*Attorney, Agent, or Firm*—Craig & Antonelli

[57] ABSTRACT

Microfiche storing means comprising a pouch shaped storing section formed by a pair of superposed transparent plastic sheets, cutout means provided at one of side peripheries of the storing section for receiving selection cords, a magnetic body provided at one of the other side peripheries of the storing section, and positioning cutout means and taking out cutout means both provided on said magnetic body.

3 Claims, 10 Drawing Figures

MICROFICHE STORING MEANS

BACKGROUND OF THE INVENTION

The present invention relates to microfiche storing means.

In general, a microfish comprises a sheet of about 0.2 mm thick, 4 inches wide and 6 inches long, which has 72 or 98 frames therein, each frame having an image or information recorded thereon. A plurality of such microfiches are usually stored by being superposed one on others, and a desired one is suitably selected and a selected image or information thereon is automatically projected on a screen with an expanded scale. However, according to a conventional microfiche searching system, each of the microfiches must have a particular treatment in accordance with the selected searching system. Therefore, different types of microfiches must be used for different types of searching systems.

In order to automatically search a microfiche, a magnetic microfiche selecting mechanism has been considered as being convenient for the purpose and providing a positive operation with a relatively simple apparatus. Therefore, in a conventional microfiche, a magnetic body is secured to one side surface of the microfiche. The magnetic body is usually provided with a searching code as well as locating and take out cutouts. However, increased time and labour are required in providing such code and cutouts. Particularly, since the searching code must be provided with a high accuracy, there have always been difficulties in forming the same. Further, the image or information portions on a microfiche may be scratched by the sharp edge on the magnetic body of the adjacent microfiche when the latter is taken out.

SUMMARY OF THE INVENTION

The present invention has an object to provide microfiche storing means which can apply to any types of conventional microfiches and in which scratching of image or information portions on a microfiche can be effectively avoided.

Another object of the present invention is to provide microfiche storing means which can conveniently be used in a magnetic type microfiche searching system.

A further object of the present invention is to provide microfiche storing means which can conveniently be used in a magnetic type microfiche searching system and in which several treatment required for the search can be simply performed.

According to the present invention, the above and other objects can be performed by a pouch shaped storing section formed by a pair of superposed transparent plastic sheets, the storing section being treated for the purpose of searching. When a magnetic type searching system is used, the storing section may be provided with a magnetic body which is formed only with a searching cutout which does not require high accuracy.

DESCRIPTION OF THE PREFERRED EMBODIMENTS

Figures 1, 2:
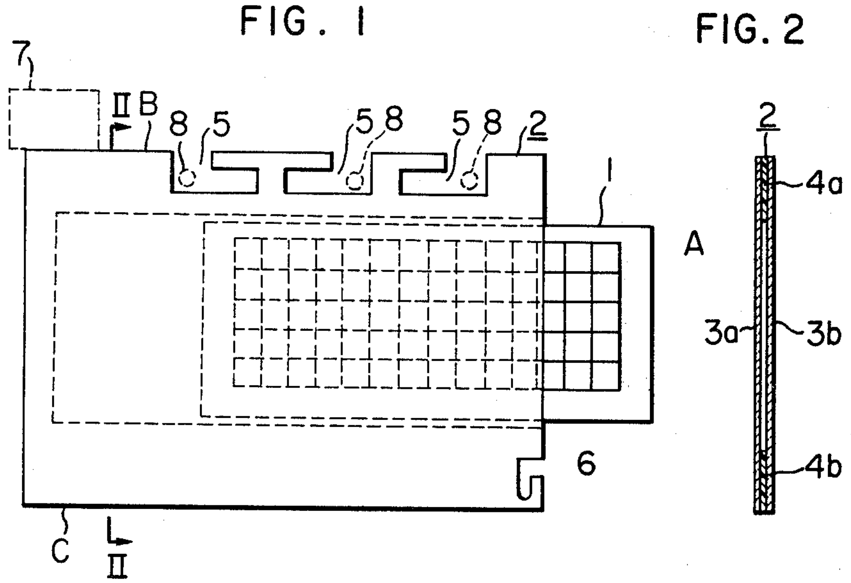
FIG. 1 is a front view showing an embodiment of the present invention.
FIG. 2 is a sectional view taken substantially along the line II — II in FIG. 1.

The present invention will further be described with respect to preferred embodiments shown in the accompanying drawings in which like parts are shown by the same reference numerals.

Referring to the drawings, particularly to FIGS. 1 and 2 which show a first embodiment of the present invention, the numeral 1 designates a microfiche which has several tens or several hundreds of images A recorded thereon. The reference numeral 2 designates a storing section formed by a pair of transparent plastic sheets 3*a* and 3*b* and plastic spacer pieces 4*a* and 4*b* which are interposed between the sheets 3*a* and 3*b* to form a pouch shaped section. The storing section 2 is formed at its one end B with a selecting code 5 and at the other end C with a take out cutout 6 which is used when the storing section 2 is taken out. The reference numeral 7 designates a vibrator comprising a vibrating body which is rotated by means of a motor. The reference numeral 8 designates searching bars which are adapted to be placed with respect to the storing section 2 as shown by dotted lines in FIG. 1. With the searching bars 8 positioned as shown by dotted lines in FIG. 1 with respect to the searching code 5, the vibrator 7 is actuated so as to cause the storing section 2 to fall downwardly when the searching bars 8 are aligned with the code 5. Thus, by varying the code cutout 5 for each storing section 2 and suitably locating the searching bars 8, a desired storing section 2 can be taken out.

Figure 3:
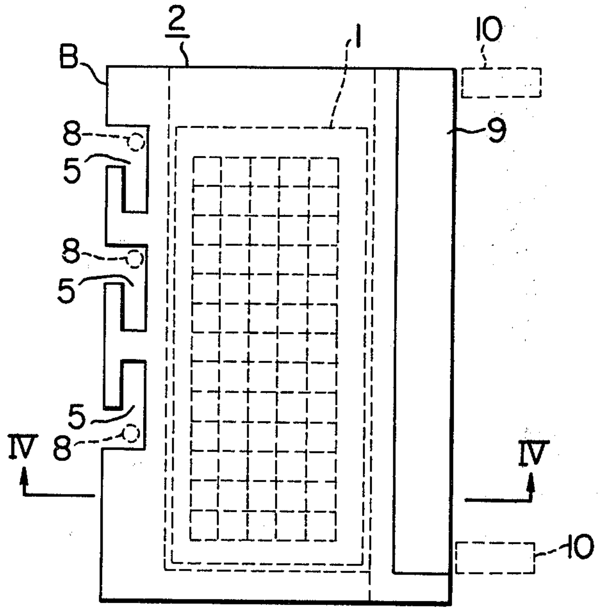
FIG. 3 is a front view showing another embodiment of the present invention.
Figure 4:
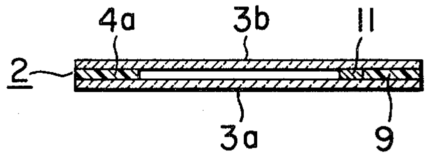
FIG. 4 is a sectional view taken substantially along the line IV — IV in FIG. 3.
Figure 5:
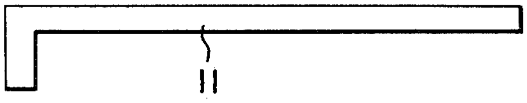
FIG. 5 is a front view showing a locating piece.

Referring now to FIGS. 3 and 4 which show a second embodiment of the present invention, a storing section 2 is provided with a magnetic body 9 which is secured to a spacer piece corresponding to the spacer piece 4*b* in FIGS. 1 and 2 by suitable means such as adhesive or welding. In this instance, the vibrator 7 in FIG. 1 is substituted by magnet means 10 which attracts the storing section 2 by magnetic force. The reference numeral 11 designates a locating piece for determining the position of the magnetic body 9 and has an L-shape as shown in FIG. 5.

Figure 6:
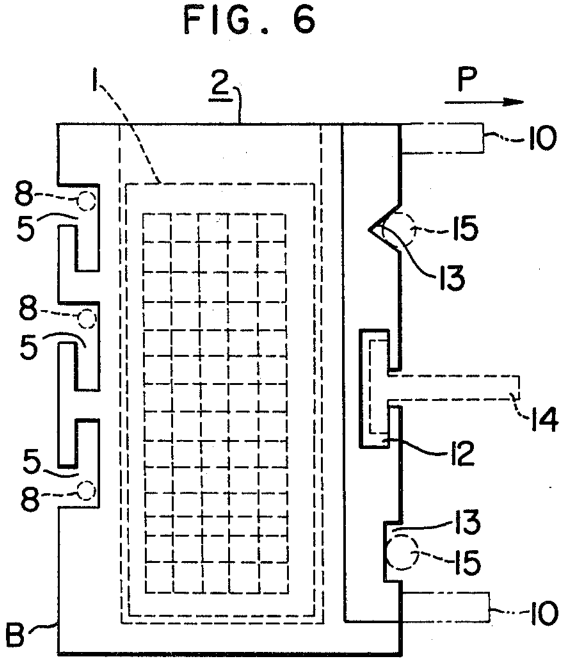
FIG. 6 is a front view showing a further embodiment of the present invention.

Referring to FIG. 6, there is shown a third embodiment of the present invention which comprises a storing section 2 having a magnetic body 9 provided as in the embodiment shown in FIGS. 3 and 4. In this embodiment, the storing section 2 has a take out cutout 12 and a locating cutout 13 which is utilized for securing the section 2 in a predetermined position. In the drawing, the reference numeral 14 designates a take out tool, and 15 locating bars.

Figure 9:
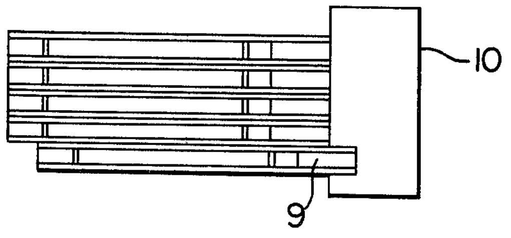
FIG. 9 is a plan view showing still further embodiment of the present invention; and, FIG. 10 is a front view of the embodiment shown in FIG. 9.
Figure 10:
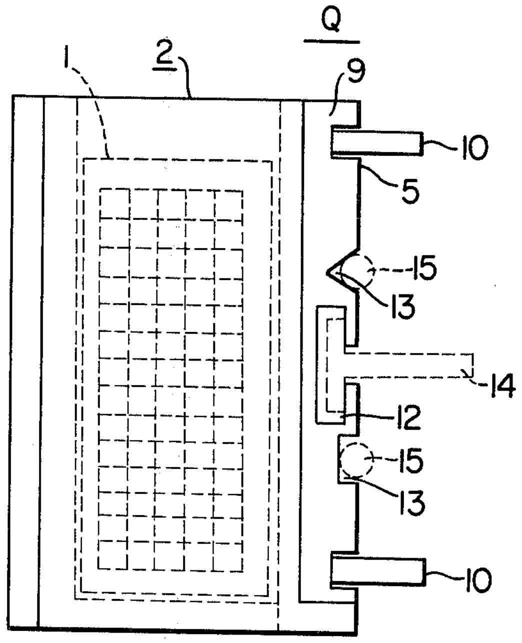

Referring further to FIGS. 9 and 10 which show a fourth embodiment of the present invention, the storing section 2 includes a magnetic body 9 formed with a selecting code 5 which is adapted to co-operate with magnet means 10, so that the storing section 2 is moved in the direction shown by an arrow Q when the magnet means 10 aligns with the selecting code 5.

Figure 7:
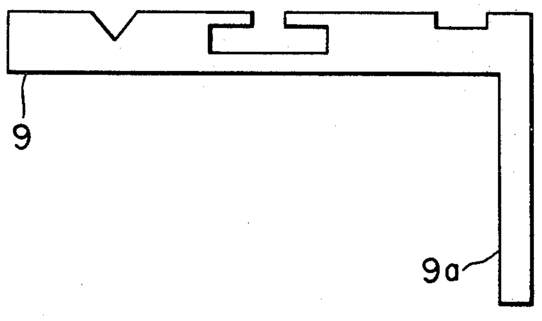
FIG. 7 is a front view showing another example of magnetic body.
Figure 8:
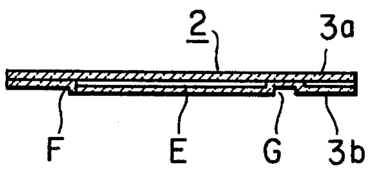
FIG. 8 is a sectional view showing a further example of storing section.

Operation of the microfiche storing means as described above will now be explained. Referring first to the embodiment shown in FIGS. 1 and 2, a plurality of storing sections 2 are usually stored with a side-by-side relationship. When it is desired to take out one section 2 from the stack, the searching bars 8 are brought into alignment with the selecting codes 5 of the desired storing section 2 and vibration is applied to the storing sections, so that only the desired section 2 is allowed to fall downwardly. Similarly, in the case of storing sections in accordance with the second embodiment of FIG. 3, the searching bars 8 are brought into alignment with the selecting code 5 of a desired storing section 2. In this case, however, the desired section 2 is taken out by the attractive force provided by the magnet means 10. In the case of the third embodiment of FIG. 6, the desired storing section 2 is partly taken out by the magnet means 10 as in the second embodiment, and thereafter the take out tool 14 is brought into engagement with the cutout 12 to draw the section 2 to a desired position. In drawing out the storing section 2 by the tool 14, the bars 15 may be used to guide the section 2 so as to prevent it from being inclined. Finally, in the case of the fourth embodiment, the storing sections 2, 2*a*, 2*b*, 2*c* and 2*d* are so formed that the searching code 5 of each section is slightly offset from those of the other sections whereby the magnet means 10 serves as searching bars and also to draw the magnetic body 9 of the selected storing section 2. As an alternative example, the magnetic body 9 may be formed in L-shape as shown in FIG. 7 so that the magnetic body 9 extends to the lower edge portion D of the storing section 2 as shown by 9*a*. This arrangement is effective to reinforce the storing section 2. Further, as shown in FIG. 8, one of the sheets 3*a* and 3*b* forming the storing section 2, for example the sheet 3*b* may be formed with stepped portions F and G. Then, the sheets 3*a* and 3*b* can be secured together to form spaces E and F therebetween without spacer pieces such as shown by 4*a* and 4*b* in FIG. 2. The space E is used for storing a microfiche 1 and the space H is used for inserting the magnetic body 9. The arrangement is advantageous in that a storing section 2 can be readily formed.

In the first embodiment shown in FIG. 1, the cutout 6 may be omitted with the spacer pieces 4*a* and 4*b* may be made with such a material that has a sufficient rigidity to reinforce the storing section 2.

The microfiche in the storing section 2 taken out as described above is then inserted into a suitable reader in which a desired information A on the microfiche is projected on a screen with an expanded scale. According to the present invention, any types of microfiches can be equally stored in the storing sections 2 and taken out as desired. Since the microfiche is completely enclosed in the storing section 2, there is no possibility that it is damaged when it is taken out. It is also possible in accordance with the present invention to prepare a large number of magnetic bodies and suitably attached to the microfiches as desired. Further, each selecting code can be precisely formed on a plastic portion of a storing section, so that it can readily and conveniently be formed than in an arrangement where the selecting code is formed in the magnetic body. According to the arrangement of the present invention, the magnetic body is formed only with locating and take out cutouts which do not require preciseness and which can be easily formed.

The invention has thus been shown and described with respect to particular embodiments, however, it should be noted that the invention is in no way limited to the details of the illustrated structures and various changes and modifications may be made without departing from the scope of the appended claims.

We claim:

1. Microfiche storing means comprising a pouch shaped storing section formed by a pair of superposed transparent plastic sheets, spacer means interposed between said plastic sheets next to three contiguous edges thereof so as to space said sheets sufficient to accommodate a single microfiche therebetween, said sheets being secured to said spacer means, and cutout means including a plurality of coded cutouts formed in one edge of the section for providing a selecting code, said one edge comprising one of said three continuous edges, wherein said storing section is provided with a magnetic body inserted between said sheets adjacent said spacer means along one edge other than the ecge where the selecting code is provided.

2. Microfiche storing means in accordance with claim 1 in which said magnetic body is provided with locating and take out cutouts.

3. Microfiche storing means comprising a pouch shaped storing section formed by a pair of superposed transparent plastic sheets secured together along three edges thereof and being of a size to accommodate one microfiche, spacer means interposed between said plastic sheets next to three continuous edges thereof so as to space said sheets sufficient to accommodate said one microfiche therebetween, said sheets being secured to said spacer means, a flat plate shaped magnetic body sandwiched between superposed portions of said transparent plastic sheets which define one edge of said section, locating and take out cutouts provided on said magnetic body through said transparent plastic sheets, and selecting code cutouts provided along one edge of the storing section other than the edge where said magnetic body is provided, said last-mentioned one edge comprising one of said three contiguous edges.

* * * * *